US012561456B2

(12) United States Patent  (10) Patent No.:  US 12,561,456 B2
Afshar et al.  (45) Date of Patent:  Feb. 24, 2026

(54) TECHNIQUES FOR STORING KEY BACKUPS

(71) Applicant: Coinbase, Inc., Oakland, CA (US)

(72) Inventors: Arash Afshar, Calgary (CA); Yehuda Lindell, Petah Tikva (IL); Guy Pe'er, Talmey Yechiel (IL)

( * ) Notice: Subject to any disclaimer, the term of this patent is extended or adjusted under 35 U.S.C. 154(b) by 85 days.

(21) Appl. No.: 18/737,815

(22) Filed: Jun. 7, 2024

(65) Prior Publication Data

US 2025/0378181 A1     Dec. 11, 2025

(51) Int. Cl.
*G06F 21/60*          (2013.01)
*G06F 11/1446*       (2026.01)

(52) U.S. Cl.
CPC ........ *G06F 21/602* (2013.01); *G06F 11/1469* (2013.01)

(58) Field of Classification Search
CPC .......................... G06F 21/602; G06F 11/1469
See application file for complete search history.

(56) References Cited

U.S. PATENT DOCUMENTS

2024/0121083 A1* 4/2024 London ..................... H04L 9/30
2024/0340177 A1* 10/2024 Chandwani ............. H04L 9/085

* cited by examiner

*Primary Examiner* — Sangseok Park
(74) *Attorney, Agent, or Firm* — Holland & Hart LLP

(57)          ABSTRACT

Methods, systems, and devices for data management are described. Techniques described herein may enable a user and a service provider to each obtain a portion of a secret key. For example, the user may generate a user portion of the secret key, encrypt the user portion of the secret key using a public encryption key, and transmit the encryption of the user portion of the secret key to the service provider. The service provider may generate a service provider portion of the secret key, encrypt the service provider portion, and transmit the encryption of the service provider portion of the secret key to the user. The user may recover the user portion of the secret key by retrieving the encryption of the user portion of the secret key from the service provider, or may generate the full secret key by decrypting the service provider portion of the secret key.

20 Claims, 7 Drawing Sheets

Key Generation Manager

525

Key Reception Manager

530

Key Verification Manager

535

Keypair Generation Manager

540

Key Encryption Manager

545

Key Storage Manager

550

Key Transmission Manager

555

Key Recovery Manager

560

520

500

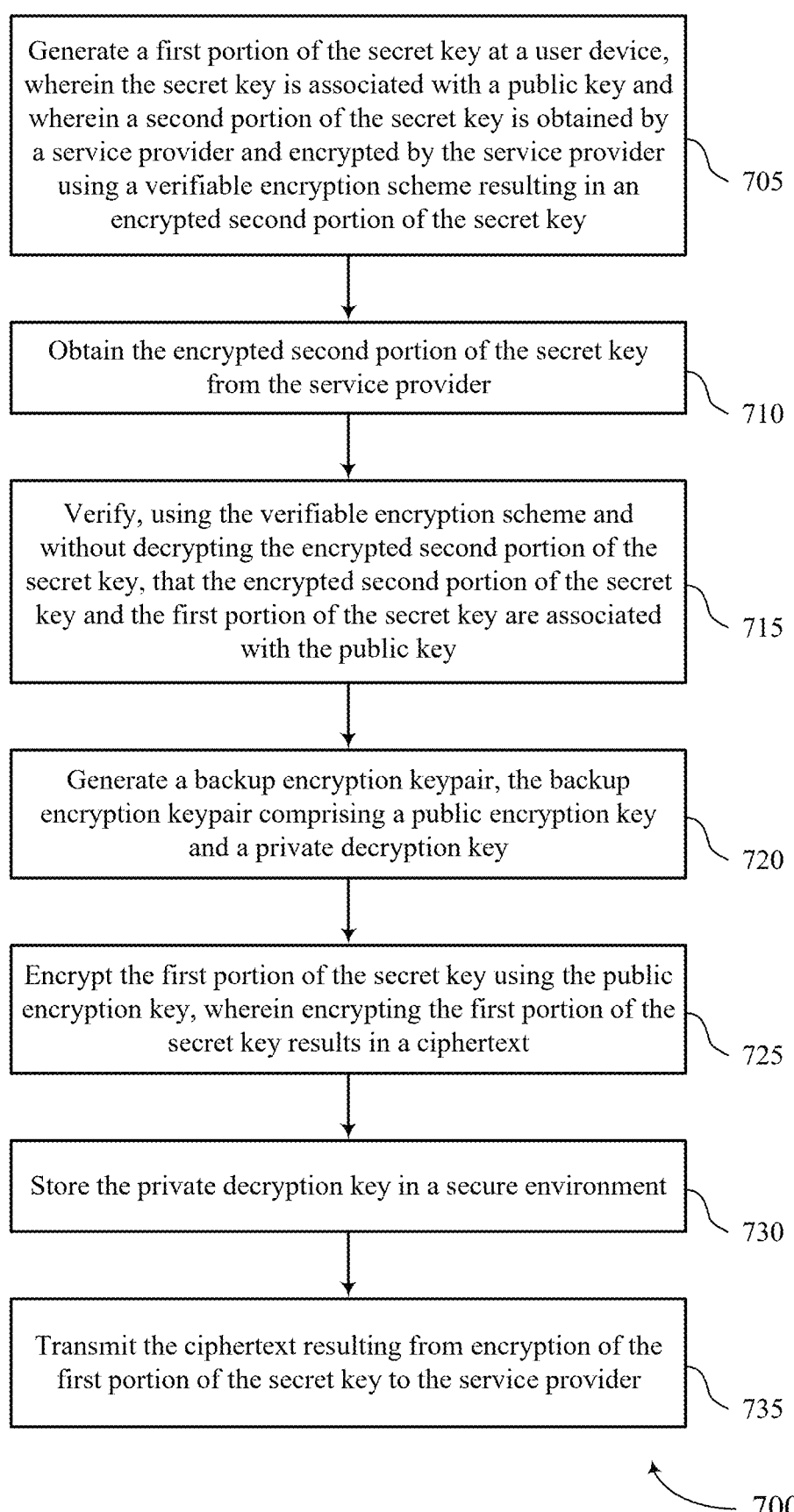

Generate a first portion of the secret key at a user device, wherein the secret key is associated with a public key and wherein a second portion of the secret key is obtained by a service provider and encrypted by the service provider using a verifiable encryption scheme resulting in an encrypted second portion of the secret key ⟍ 705

Obtain the encrypted second portion of the secret key from the service provider ⟍ 710

Verify, using the verifiable encryption scheme and without decrypting the encrypted second portion of the secret key, that the encrypted second portion of the secret key and the first portion of the secret key are associated with the public key ⟍ 715

Generate a backup encryption keypair, the backup encryption keypair comprising a public encryption key and a private decryption key ⟍ 720

Encrypt the first portion of the secret key using the public encryption key, wherein encrypting the first portion of the secret key results in a ciphertext ⟍ 725

Store the private decryption key in a secure environment ⟍ 730

Transmit the ciphertext resulting from encryption of the first portion of the secret key to the service provider ⟍ 735

TECHNIQUES FOR STORING KEY BACKUPS

The present disclosure relates generally to data management, including techniques for techniques for storing key backups.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIG. 7 shows a flowchart illustrating methods that support techniques for storing key backups in accordance with aspects of the present disclosure.

DETAILED DESCRIPTION

A user may use a secret key to access a digital wallet to perform (e.g., sign and broadcast) transactions via a blockchain network. In some examples, the user may store the secret key locally, such that the user may access the digital wallet on demand. However, the user may lose the secret key (e.g., or a seed phrase associated with the secret key), which may prevent the user from accessing the digital wallet. Additionally, a user device storing the secret key or self-storage may be susceptible to an unauthorized user obtaining the secret key and accessing the digital wallet. In some examples, a service provider (e.g., a custodial token platform) may store the secret key (e.g., a custodial wallet), which may prevent the user from losing the key and may be relatively more secure than the user device. However, as the service provider stores and manages the secret key on behalf of the user, the user and wallet is subject to third party risk such as service provider failure, hacking, mismanagement, or the like.

Accordingly, techniques described herein may enable the user and the service provider to each obtain a portion of the secret key such that the user may access the digital wallet at will and recover the secret key in examples in which the user loses the user portion of the secret key. For example, the user may generate an encryption keypair, including a public encryption key and a private decryption key (e.g., stored in a secure location, such as a storage cloud separate from the user device). The user may generate a user portion of the secret key and encrypt the user portion of the secret key using the public encryption key. The user may transmit the encryption of the user portion of the secret key to the service provider. Similarly, the service provider may generate (or otherwise obtain) a service provider portion of the secret key, encrypt the service provider portion of the secret key (e.g., using a verifiable encryption keypair generated by the user), and transmit the encryption of the service provider portion of the secret key to the user device.

In some examples, if the user loses the user portion of the secret key, the user may request the service provider to transmit the encryption of the user portion of the secret key to the user device. The user may retrieve the secret decryption key from the storage cloud and decrypt the encryption of the user portion of the secret key, thereby obtaining the user portion of the secret key. In some examples, for the user to export the digital wallet (e.g., open the wallet on another device or system), the user may decrypt the encryption of the service provider portion of the secret key and combine the service provider portion of the secret key with the user portion of the secret key to generate the full secret key. The user may accordingly access the digital wallet on demand (e.g., without requesting the secret key from the service provider).

Figure 1:
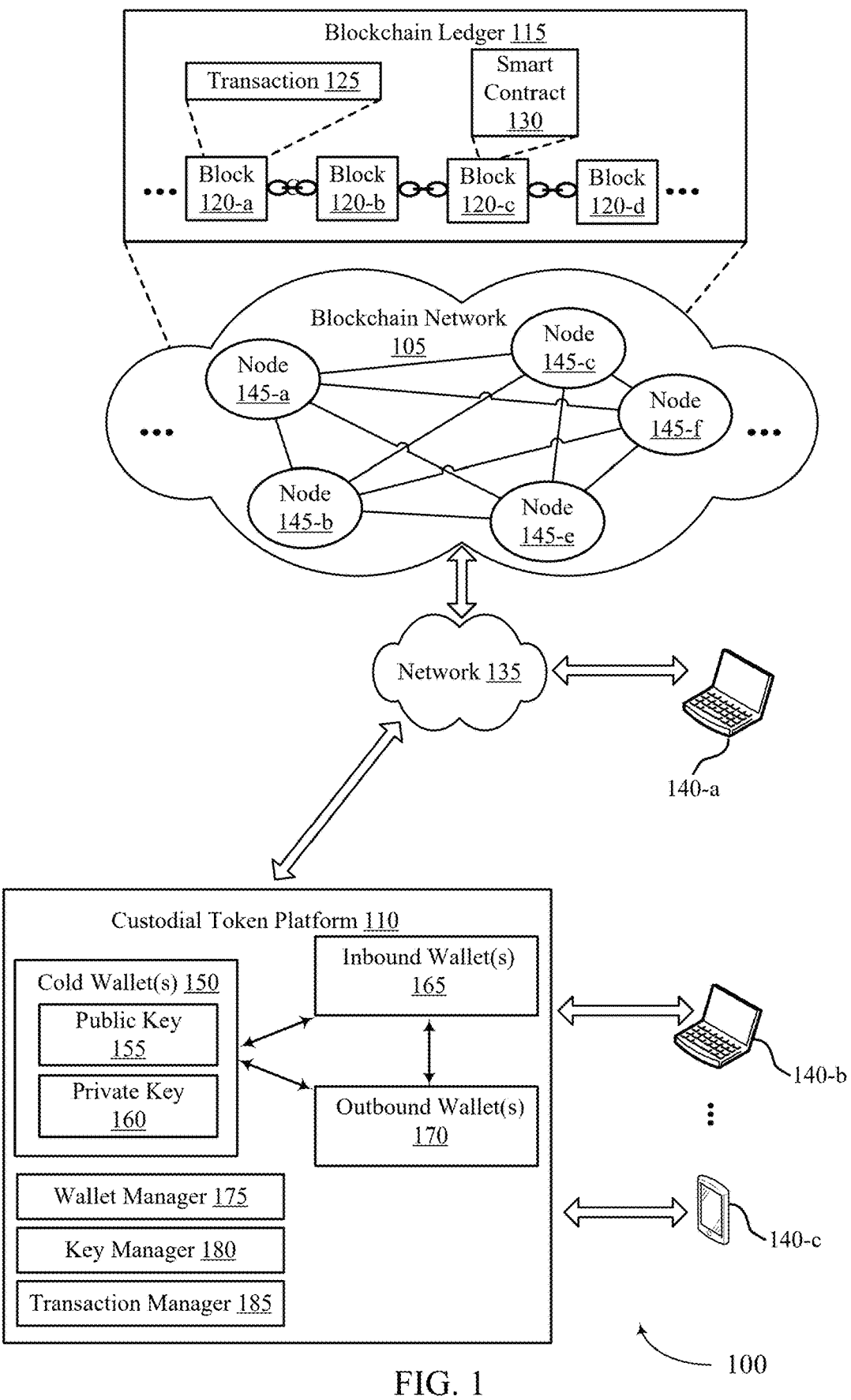
FIG. 1 illustrates an example of a computing environment that supports techniques for storing key backups in accordance with aspects of the present disclosure.

FIG. 1 illustrates an example of a computing environment 100 that supports techniques for storing key backups in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105 (e.g., a node 145-*a*, a node 145-*b*, a node 145-*c*, a node 145-*c*, a node 145-*f*), and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-a, 120-b, 120-c, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a, 140-b, or 140-c) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-a may provide user inputs via the computing device 140-a, which may result in commands, data, or any combination thereof being communicated via the network 135 to the computing system custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

In some examples, a service provider (e.g., a custodial token platform 110) and a computing device 140 may communicate in order to back up a secret (e.g., a private key, a private key share, etc.) and verify a set of parts (of the secret, such as parts of a private key or parts of a private key share) provided to the server via a client application on the computing device 140. The service provider may use an encryption scheme such that an encrypted value x (e.g., the secret) has a property $Q=g^x$ where Q is publicly known. For example, Q may be a public value corresponding to the secret, such as a public key 155 corresponding to a private key 160. Such an encryption scheme that may enable a user to verify that an encryption is of a correct value (e.g., that an encryption is of the secret x, rather than of another value) may be referred to herein as a verifiable encryption scheme.

A verifiable encryption scheme may generally involve three parties (e.g., three participants in a protocol or scheme), including a sender (e.g., the service provider), a receiver (e.g., the computing device 140), and a verifier (e.g., the computing device 140). In a public key encryption scheme, the sender may send a message x to the receiver by encrypting the message using the receiver's public key pk. This operation is denoted as $c=enc(pk, x)$. The receiver may recover the original message x by decrypting the ciphertext c with its secret sk, which may be expressed as $x=dec(sk, c)$. In a verifiable encryption scheme, at least some information about the message x is made public in the form of $Q=f(x)$, allowing the receiver to verify the correctness of the received message. The effectiveness of the scheme may be dependent on f being a one-way function. Namely, it should be easy to compute Q from x, but practically impossible to calculate x from Q. In the example above, $f(x)=g^x$ where $g^x$ is a one-way function. Therefore, in a verifiable encryption scheme, a third party verifier may confirm that for the given ciphertext c, the receiver may retrieve x (by $x=dec(sk, c)$) that corresponds to the public information Q associated with the public key pk. In other words, if $Q=g^x$, then $x=dec(sk, c)$ Techniques described herein may enable a device and a service provider (e.g., a custodial token platform 110) to each obtain a portion of a secret key (e.g., a private key 160) such that the user may access a digital wallet (e.g., a cold wallet 150) and recover the secret key in examples in which the user loses the user portion of the secret key. For example, the computing device 140 may generate an encryption keypair, including a public encryption key and a private decryption key (e.g., stored in a secure location, such as a storage cloud separate from the computing device 140). The computing device 140 may generate a user portion of the secret key and may encrypt the user portion of the secret key using the public encryption key. The computing device 140 may transmit the encryption of the user portion of the secret key to the service provider. Similarly, the service provider may generate (or otherwise obtain) a service provider portion of the secret key, encrypt the service provider portion of the secret key (e.g., using a verifiable encryption keypair generated by the user), and transmit the encryption of the service provider portion of the secret key to the computing device 140.

In some examples, if the user loses the user portion of the secret key, the user may request, via the computing device 140, the service provider to transmit the encryption of the user portion of the secret key to the user device. The computing device 140 may retrieve the secret decryption key from the storage cloud and decrypt the encryption of the user portion of the secret key, thereby obtaining the user portion of the secret key. In some examples, for the user to access the digital wallet, the computing device 140 may decrypt the encryption of the service provider portion of the secret key and combine the service provider portion of the secret key with the user portion of the secret key to generate the full secret key. The user may accordingly access the digital wallet without requesting the secret key from the service provider.

While some techniques described herein are described with reference to protecting cryptographic keys in the context of blockchain scenarios, it should be understood that the techniques are applicable in other contexts.

Figure 2:
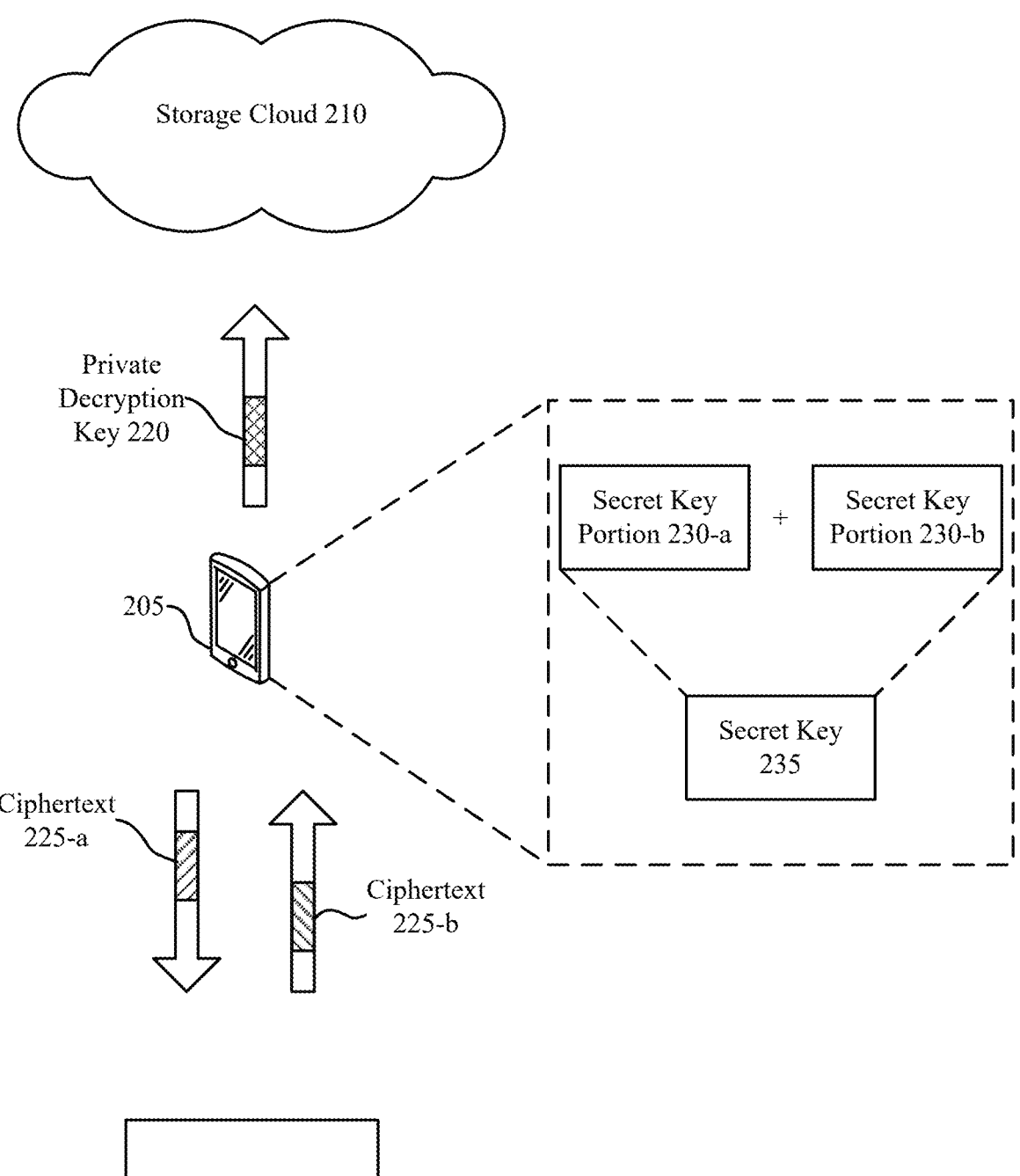
FIG. 2 shows an example of a system that supports techniques for storing key backups in accordance with aspects of the present disclosure.

FIG. 2 shows an example of a system 200 that supports techniques for storing key backups in accordance with aspects of the present disclosure. The system 200 may implement or may be implemented by aspects of the computing environment 100. For example, the system 200 may include a service provider 215 a user device 205. The service provider 215 may be an example of the custodial token platform 110 as described with respect to FIG. 1, and the user device 205 may be an example of the computing devices 140 as described with respect to FIG. 1.

In some examples, as described with reference to FIG. 1, a user may access a digital wallet for interacting with a blockchain network using a secret key (e.g., a private key 160). The secret key 235 (e.g., x) may be a scalar value associated with a public key 155, where the public key 155 may be computed as $Q=x*G$, where G is a public value corresponding to a generator of a mathematical group. For example, G may be a base point of an elliptic curve (e.g., scep256k1). In some examples, the digital wallet may be a self-custody wallet for which the user (e.g., the owner of the wallet) has full access to the wallet and may perform transactions using the secret key (e.g., without secret key management assistance from the custodial token platform).

In some examples of self-custody wallets, the user may have full access to the secret key 235 (e.g., x), and may be responsible for safeguarding the secret key 235 (e.g., at a user device 205 or another device, such as a hardware key device) or a seed phrase associated with the secret key 235. In some examples, however, a user may lose the secret key 235 (or the seed phrase) and therefore lose access to the digital wallet, or may have funds stolen as a result of an unauthorized user gaining access to the secret key 235. Accordingly, the user may entrust the secret key to a third party (e.g., a service provider 215, a central crypto exchange, a custodial token platform), which may be relatively more secure than the user device 205. However, the user may access the digital wallet if the service provider 215 allows the user to obtain the secret key 235, and the user may therefore have relatively less autonomy to access the digital wallet as compared to self-custody digital wallets (e.g., due to the funds in the digital wallet not being fully in control of the user). Additionally, the user may not trust the service provider 215 with the funds, for example, if the service provider 215 becomes compromised.

Accordingly, techniques described herein may enable the user and the service provider to split the secret key 235 into two parts (e.g., a secret key portion 230-a, which may be a user portion x_u, and a secret key portion 230-b, which may be a service provider portion x_s). For example, the user device 205 and the service provider 215 may each generate a respective secret key portion 230, such that a secret key portion 230-a and a secret key portion 230-b may combine to generate the secret key 235 (e.g., using a key agreement protocol). Additionally, or alternatively, one of the user device 205 and the service provider 215 may generate the full secret key 235, and may provide the other party with the respective secret key portion 230.

In some examples, however, the user may still not have full custody of the digital wallet. That is, the user may request the secret key portion 230-b from the service provider 215 to gain access to the digital wallet, which may not provide the user with full access to the funds. Further, the user may lose the secret key portion 230-a, which may result in the user losing access to the digital wallet.

In some aspects, the user device 205 and the service provider 215 may perform key generation to generate a secret key portion 230-a and a secret key portion 230-b, respectively. The user device 205 and the service provider 215 may perform key generation to further generate a public key Q associated with the secret key 235. The user device 205 may further generate a verifiable encryption keypair of a verifiable encryption scheme venc, vdec, vverify (e.g., vK and vQ, where vK is a secret verifiable decryption key and vQ is a public verifiable encryption key) and a backup encryption keypair of a backup encryption scheme benc, bdec (e.g., bK and bQ, where bK is a private decryption key 220 and bQ is a public encryption key). In some examples, the user device 205 may generate symmetric encryption keys, such as for advanced encryption standard (AES), or encryption keys for a public-key encryption technique such as Rivest Shamir, Adleman (RSA) encryption. In some examples, if a threshold scheme is used for the backup encryption keypair, the user device 205 and the service provider 215 may jointly perform key generation to obtain shares of the backup decryption keypair.

The user may store (e.g., securely backup) the private decryption key 220 (e.g., and the public key Q) in a secure location separate from the user device 205, such as a storage cloud 210. In some examples, the user may not backup the secret key portion 230-a in the secure location. For example, the user may store the secret key portion 230-a on the user device 205. Accordingly, if an unauthorized user gains access to the storage cloud 210, the unauthorized user may obtain the private decryption key 220 (e.g., and not the secret key portion 230-a), which the unauthorized user may not use to access the digital wallet and participate in a blockchain transaction without obtaining an encryption of the secret key portion 230-a and the secret key portion 230-b. The user device 205 may provide the public verifiable encryption key of the verifiable encryption keypair to the service provider 215.

For a backup procedure, the user device 205 may backup the secret key portion 230-a using the backup encryption keypair (e.g., to generate ciphertext 225-a associated with the secret key portion 230-a, such as bc_u=benc(bQ, x_u‖auxiliary data)). The user device 205 may send the ciphertext 225-a (e.g., bc_u) to the service provider 215. The service provider 215 may not decrypt the ciphertext 225-a (e.g., as the service provider 215 may not have access to the private decryption key 220). The service provider 215 may securely backup the ciphertext 225-a (e.g., bc_u), the secret key portion 230-*b* (e.g., x_s), and the public key Q (e.g., and other auxiliary data and a decryption keyshare for the threshold decryption scheme, if used).

For a recovery procedure, if the user loses the secret key portion 230-*a* (e.g., if the user loses access to the user device 205 but not to the storage cloud 210), the user may recover the secret key portion 230-*a* from the service provider. For example, the service provider may perform a security procedure to verify an authenticity of the user according to security standards (e.g., via security questions, dual authentication techniques, username/password authentication, video call, identity verification, and the like). After authenticating the user, the service provider 215 may provide the ciphertext 225-*a* associated with the secret key portion 230-*a* to the user.

The user may retrieve the private decryption key 220 (e.g., bk) and the public key Q from the secure location (e.g., the storage cloud 210). The user may accordingly decrypt the ciphertext 225-*a* associated with the secret key portion 230-*a* (e.g., bc_u) to obtain the secret key portion 230-*a* (e.g., x_u and any auxiliary data). In some examples, if a threshold encryption scheme is used, the service provider 215 and the user (e.g., and one or more other parties) may jointly perform the decryption. The user may verify that the auxiliary data is consistent with the secret key portion 230-*a* and the public key Q, and may therefore accept the decryption as the secret key portion 230-*a*.

For a backup procedure that enables export (e.g., generation of the secret key 235 to access the digital wallet), the service provider 215 may encrypt the secret key portion 230-*b* using the verifiable encryption scheme (e.g., vc_s=enc (vQ, x_s)). The service provider 215 may provide a ciphertext 225-*b* associated with the secret key portion 230-*b* (e.g., vc_s) to the user device 205. As described herein, the verifiable encryption scheme may be a symmetric key encryption scheme or another scheme that enables the user device 205 to verify that the ciphertext 225-*b* is an encryption of the secret key portion 230-*b* without decrypting the ciphertext 225-*b* (e.g., without knowledge of the full secret key 235).

For example, given the public key Q associated with the secret key 235, the user device 205 may verify that the ciphertext satisfies a relationship between a portion of the public key Q and the secret key portion 230-*b*. The user may compute a portion of the public key Q associated with the secret key portion 230-*b* by subtracting a portion of the public key Q associated with the secret key portion 230-*a* (e.g., x_u.G) from the public key Q. The user device 205 may input the ciphertext 225-*b* and the portion of the public key Q associated with the secret key portion 230-*b* into a function to verify that the ciphertext 225-*b* is an encryption of the secret key portion 230-*b*.

In some examples, the user device 205 may encrypt the ciphertext 225-*b* using a password hardening technique (e.g., a password hardened elliptic curve integrated encryption scheme (ECIES)). For example, the user device 205 may generate a password hardened ECIES (e.g., henc, hdec) and may encrypt the ciphertext 225-*b* using the password hardened encryption scheme to generate additional ciphertext hc_s=henc(vc_s, passcode, salt), where the passcode is a user-provided password. In some examples, the password hardened ECIES may include generating ciphertext including a first elliptic curve point and an encrypted message, generating a second elliptic curve point using the user-provided password, and adding the second elliptic curve point to the first elliptic curve point to modify the ciphertext.

Such techniques may prevent a brute force attack from obtaining vc_s from hc_s if an unauthorized user gains access to hc_s.

In some examples, the user may not back up the salt in the secure location (e.g., the user may store the salt on the user device 205). If the user loses the salt or forgets the user-provided password, the user may request the service provider 215 to provide the ciphertext 225-*b* and may re-encrypt the ciphertext 225-*b* using the password hardened ECIES.

In some examples, to perform an export (e.g., to generate the secret key 235 and access the digital wallet to perform a transaction), the user device 205 may retrieve the verifiable decryption key of the verifiable encryption scheme. The user device 205 may decrypt the ciphertext 225-*b* using the verifiable decryption key to obtain the secret key portion 230-*b*. In some examples, if password hardening is used on the ciphertext 225-*b*, the user device 205 may perform a decryption using the user-provided password and the ECIES to generate the ciphertext 225-*b*, and may then decrypt the ciphertext 225-*b* using the verifiable decryption key to obtain the secret key portion 230-*b*. The user device 205 may retrieve the secret key portion 230-*a* and add the secret key portion 230-*b* to the secret key portion 230-*a* to generate the secret key 235.

Figure 3:
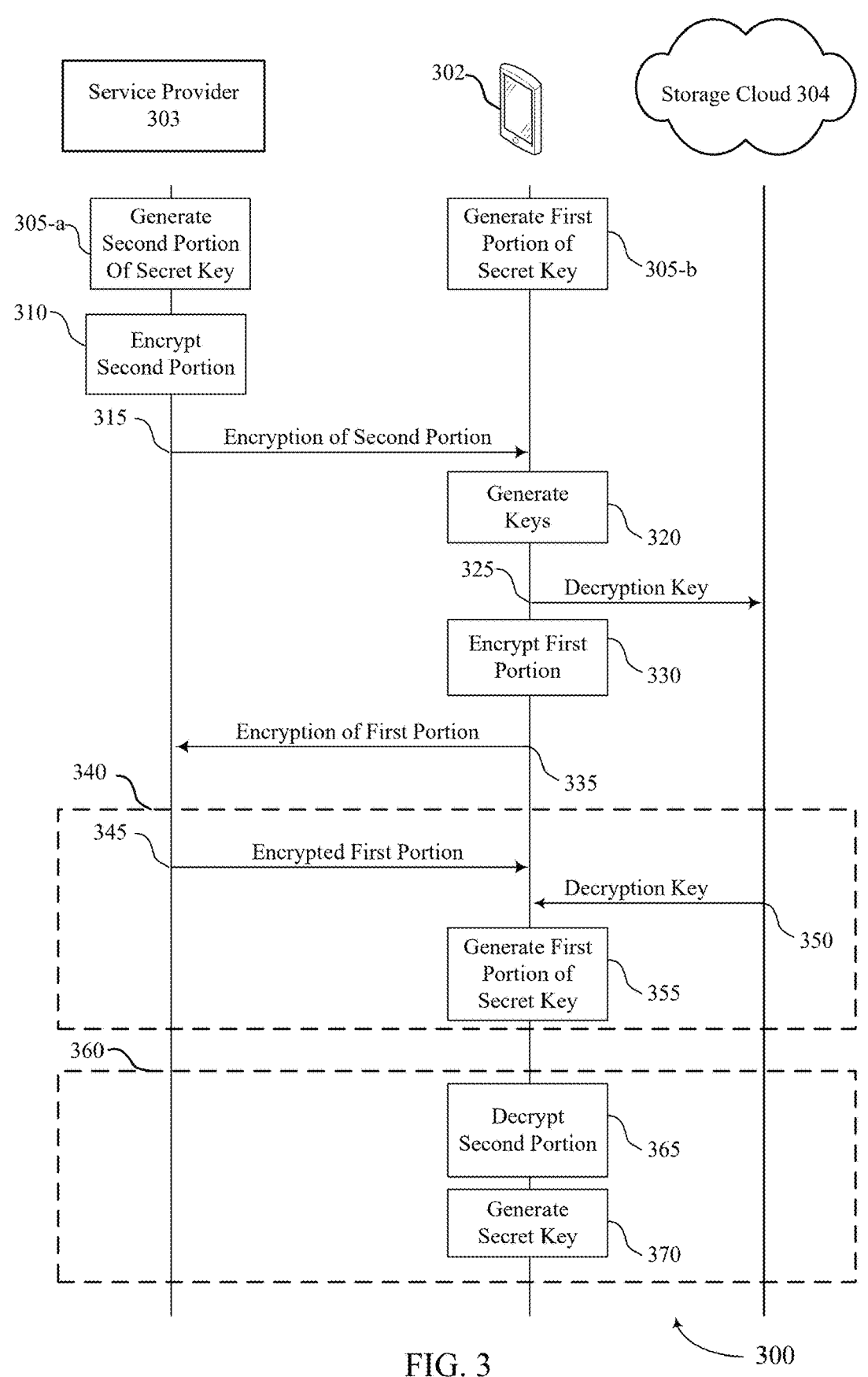
FIG. 3 shows an example of a process flow that supports techniques for storing key backups in accordance with aspects of the present disclosure.

FIG. 3 shows an example of a process flow 300 that supports techniques for storing key backups in accordance with aspects of the present disclosure. The process flow 300 may implement or may be implemented by aspects of the computing environment 100 or the system 200. For example, the process flow 300 may include a service provider 303, a user device 302, and a storage cloud 304, which may be examples of the corresponding devices as described with reference to FIGS. 1 and 2.

In the following description of the process flow 300, the operations between the service provider 303, the user device 302, and the storage cloud 304 may occur in a different order than the example order shown and, in some examples, may be performed by one or more different devices other than those shown as examples. Some operations also may be omitted from the process flow 300, and other operations may be added to the process flow 300. Further, although some operations or signaling may be shown to occur at different times for discussion purposes, these operations may actually occur at the same time.

At 305-*a* and 305-*b*, the service provider 303 and the user device 302 may generate a second portion of a secret key (e.g., a private key 160 associated with a public key 155, as described with reference to FIG. 1) and a first portion of the secret key, respectively. At 310, the service provider 303 may encrypt the second portion of the secret key using a verifiable encryption scheme. For example, the user device 302 may generate a public verifiable encryption key and a private verifiable decryption key associated with a verifiable encryption scheme, and may provide the public verifiable encryption key to the service provider such that the service provider may encrypt the second portion of the secret key.

At 315, the service provider may provide the encryption of the second portion of the secret key to the user device 302. In some examples, the user device 302 may verify the encryption of the second portion of the secret key using the verifiable encryption scheme without decrypting the encryption of the second portion of the secret key. For example, the user device 302 may compute a portion of the public key 155 associated with the second portion of the secret key using the first portion of the secret key and the public verifiable encryption key. The user device 302 may verify that the second portion of the secret key is encrypted using the computed portion of the public key 155 without decrypting (e.g., revealing) the second portion of the secret key.

At 320, the user device 302 may generate a private decryption key and a public encryption key (e.g., a backup encryption keypair). At 325, the user device 302 may store the private decryption key in a secure environment, such as the storage cloud 304. At 330, the user device 302 may encrypt the first portion of the secret key using the public encryption key. In some examples, the user device 302 may receive a user-provided password to password harden the encryption of the first portion of the secret key. At 335, the user device 302 may transmit the encryption of the first portion of the secret key (e.g., ciphertext resulting from the encryption) to the service provider 303.

At 340, the user device 302 may perform a recovery procedure to recover the first portion of the secret key (e.g., if the user lost the first portion of the secret key). For example, the user device 302 may receive a request to recover the first portion of the secret key. Accordingly, at 345, the user device 302 may obtain the ciphertext resulting from the encryption of the first portion of the secret key from the service provider 303. In some examples, the service provider 303 may perform an authentication procedure to authenticate the user prior to providing the ciphertext.

At 350, the user device 302 may obtain the private decryption key from the secure location (e.g., from the storage cloud 304). At 355, the user device 302 may decrypt the first portion of the secret key using the ciphertext and the private decryption key. Accordingly, the user may obtain the first portion of the secret key. In some examples, the user device 302 may perform a threshold decryption operation with two or more parties (e.g., including the service provider 303) to decrypt the encryption of the first portion of the secret key. If the user device 302 performed a password hardening on the first portion of the secret key, the user device 302 may use the user-provided password to decrypt the first portion of the secret key.

At 360, the user device 302 may perform an export procedure to obtain the full secret key. For example, the user device 302 may receive a request from the user to obtain the secret key. At 365, the user device 302 may decrypt the encryption of the second portion of the secret key using the secret verifiable decryption key. In some examples, if the user device 302 performed password hardening on the second portion of the secret key, the user device 302 may use the user-provided password to decrypt the second portion of the secret key. At 370, the user device 302 may obtain the first portion of the secret key and may combine the first portion of the secret key and the decrypted second portion of the secret key to generate the full secret key.

Figure 4:
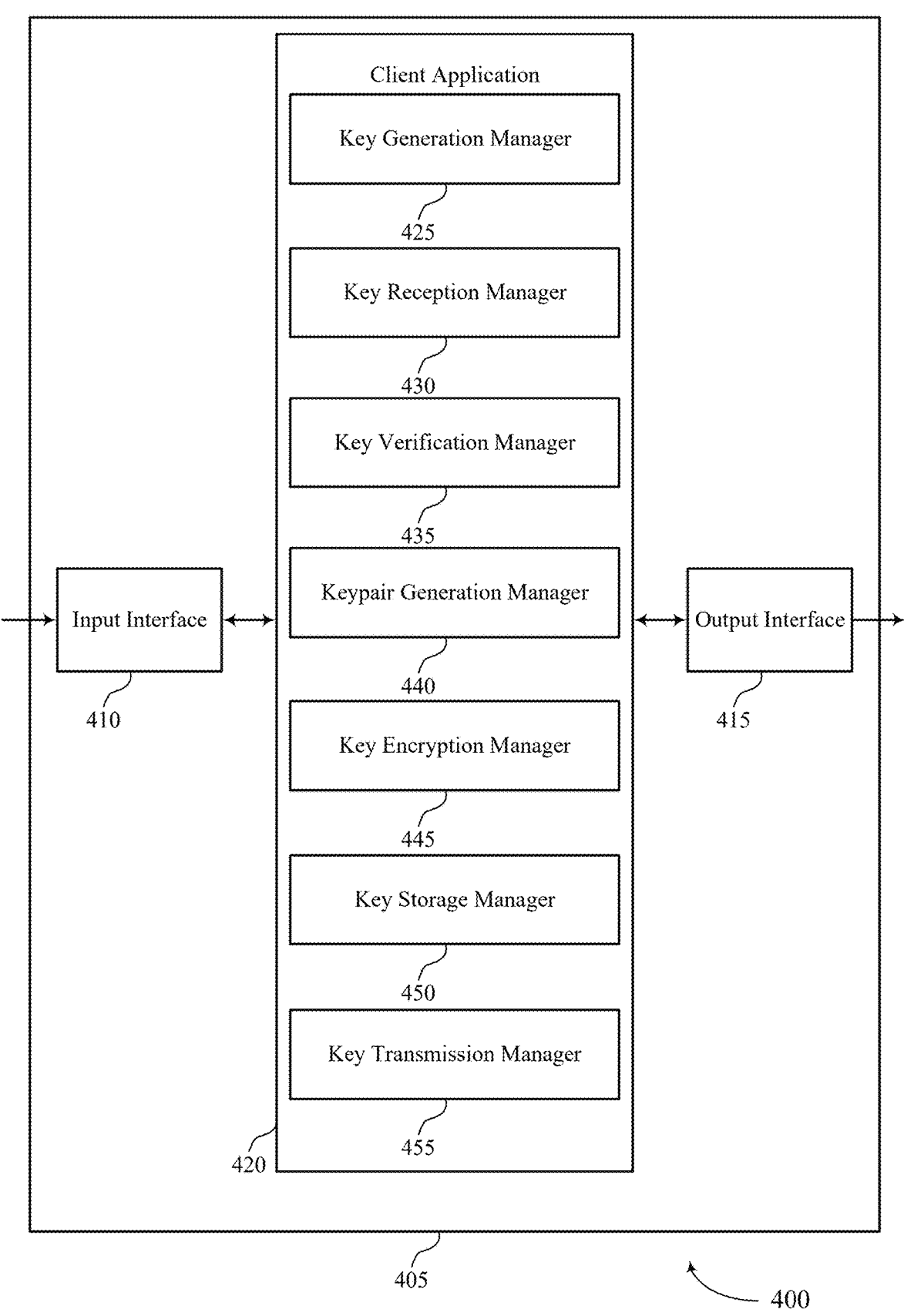
FIG. 4 shows a block diagram of an apparatus that supports techniques for storing key backups in accordance with aspects of the present disclosure.

FIG. 4 shows a block diagram 400 of a device 405 that supports techniques for storing key backups in accordance with aspects of the present disclosure. The device 405 may include an input interface 410, an output interface 415, and a client application 420. The device 405, or one or more components of the device 405 (e.g., the input interface 410, the output interface 415, the client application 420), may include at least one processor, which may be coupled with at least one memory, to support the described techniques. Each of these components may communicate, directly or indirectly, with one another (e.g., via one or more buses, communications links, communications interfaces, or any combination thereof).

The input interface 410 may manage input signaling for the user device 405. For example, the input interface 410 may receive input signaling (e.g., messages, packets, data, instructions, commands, transactions, or any other form of encoded information) from other systems or devices. The input interface 410 may send signaling corresponding to (e.g., representative of or otherwise based on) such input signaling to other components of the user device 405 for processing. For example, the input interface 410 may transmit such corresponding signaling to the client application 420 to support techniques for storing key backups. In some cases, the input interface 410 may be a component of a communication interface 610 as described with reference to FIG. 6.

The output interface 415 may manage output signaling for the user device 405. For example, the output interface 415 may receive signaling from other components of the user device 405, such as the client application 620, and may transmit such output signaling corresponding to (e.g., representative of or otherwise based on) such signaling to other systems or devices. In some cases, the output interface 415 may be a component of a user interface 625 as described with reference to FIG. 6.

For example, the client application 420 may include a key generation manager 425, a key reception manager 430, a key verification manager 435, a keypair generation manager 440, a key encryption manager 445, a key storage manager 450, a key transmission manager 455, or any combination thereof. In some examples, the client application 420, or various components thereof, may be configured to perform various operations (e.g., receiving, monitoring, transmitting) using or otherwise in cooperation with the input interface 410, the output interface 415, or both. For example, the client application 420 may receive information from the input interface 410, send information to the output interface 415, or be integrated in combination with the input interface 410, the output interface 415, or both to receive information, transmit information, or perform various other operations as described herein.

The client application 420 may support management of a secret key in accordance with examples as disclosed herein. The key generation manager 425 may be configured as or otherwise support a means for generating a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key. The key reception manager 430 may be configured as or otherwise support a means for obtaining the encryption of the second portion of the secret key from the service provider. The key verification manager 435 may be configured as or otherwise support a means for verifying, using the verifiable encryption scheme and without decrypting the encryption of the second portion of the secret key, that the encryption of the second portion of the secret key and the first portion of the secret key are associated with the public key. The keypair generation manager 440 may be configured as or otherwise support a means for generating a backup encryption keypair, the backup encryption keypair comprising a public encryption key and a private decryption key. The key encryption manager 445 may be configured as or otherwise support a means for encrypting the first portion of the secret key using the public encryption key, wherein encrypting the first portion of the secret key results in a ciphertext. The key storage manager 450 may be configured as or otherwise support a means for storing the private decryption key in a secure environment. The key transmission manager 455 may be configured as or otherwise support a means for transmitting the ciphertext resulting from encryption of the first portion of the secret key to the service provider.

Figure 5:
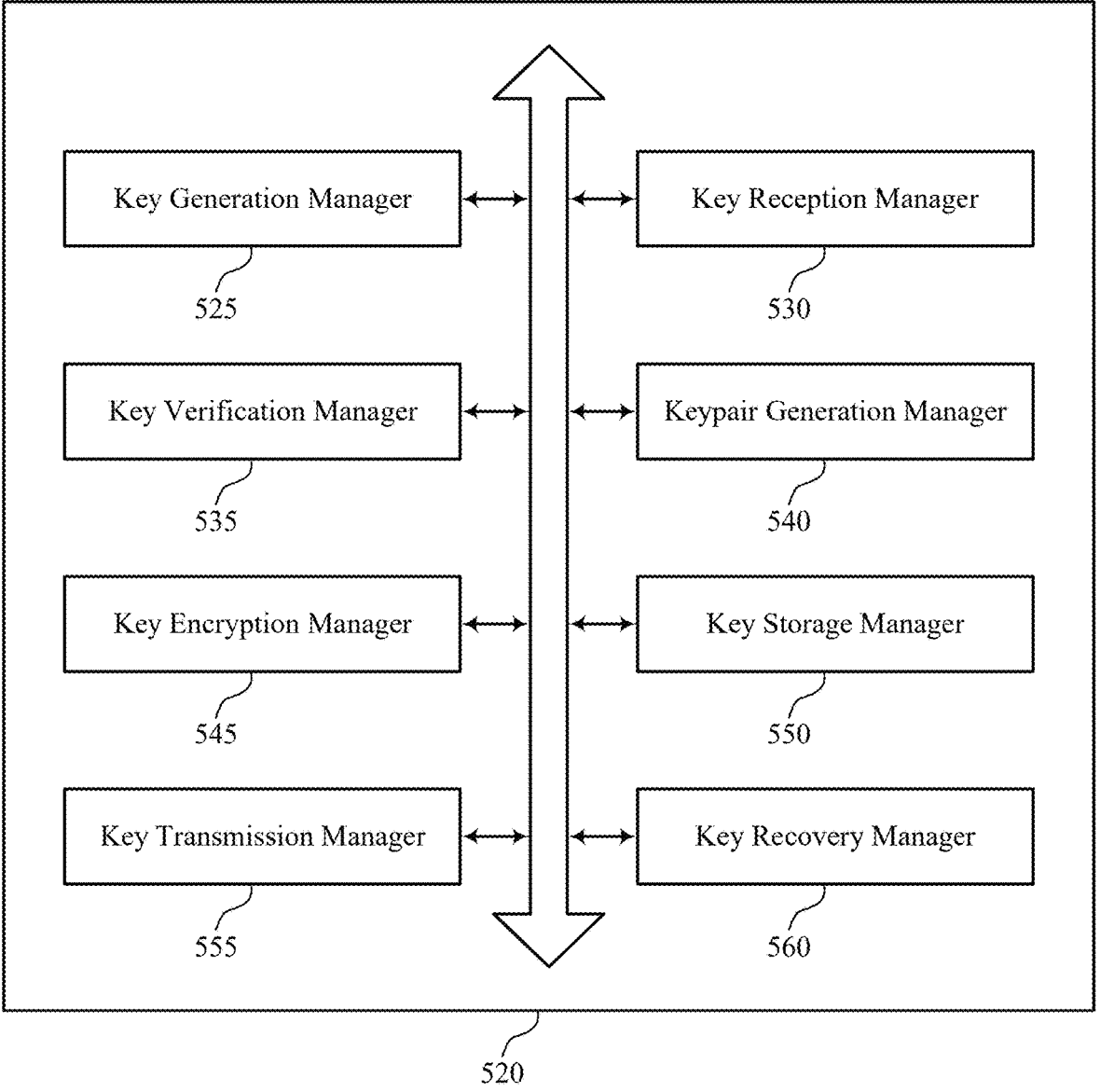
FIG. 5 shows a block diagram of a client application that supports techniques for storing key backups in accordance with aspects of the present disclosure.

FIG. 5 shows a block diagram 500 of a client application 520 that supports techniques for storing key backups in accordance with aspects of the present disclosure. The client application 520 may be an example of aspects of a client application or a client application 420, or both, as described herein. The client application 520, or various components thereof, may be an example of means for performing various aspects of techniques for storing key backups as described herein. For example, the client application 520 may include a key generation manager 525, a key reception manager 530, a key verification manager 535, a keypair generation manager 540, a key encryption manager 545, a key storage manager 550, a key transmission manager 555, a key recovery manager 560, or any combination thereof. Each of these components, or components of subcomponents thereof (e.g., one or more processors, one or more memories), may communicate, directly or indirectly, with one another (e.g., via one or more buses).

The client application 520 may support management of a secret key in accordance with examples as disclosed herein. The key generation manager 525 may be configured as or otherwise support a means for generating a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key. The key reception manager 530 may be configured as or otherwise support a means for obtaining the encryption of the second portion of the secret key from the service provider. The key verification manager 535 may be configured as or otherwise support a means for verifying, using the verifiable encryption scheme and without decrypting the encryption of the second portion of the secret key, that the encryption of the second portion of the secret key and the first portion of the secret key are associated with the public key. The keypair generation manager 540 may be configured as or otherwise support a means for generating a backup encryption keypair, the backup encryption keypair comprising a public encryption key and a private decryption key. The key encryption manager 545 may be configured as or otherwise support a means for encrypting the first portion of the secret key using the public encryption key, wherein encrypting the first portion of the secret key results in a ciphertext. The key storage manager 550 may be configured as or otherwise support a means for storing the private decryption key in a secure environment. The key transmission manager 555 may be configured as or otherwise support a means for transmitting the ciphertext resulting from encryption of the first portion of the secret key to the service provider.

In some examples, the key recovery manager 560 may be configured as or otherwise support a means for receiving a request to recover the first portion of the secret key. In some examples, the key recovery manager 560 may be configured as or otherwise support a means for obtaining, from the service provider in response to receiving the request, the ciphertext resulting from encryption of the first portion of the secret key. In some examples, the key recovery manager 560 may be configured as or otherwise support a means for obtaining, from the secure environment, the private decryption key. In some examples, the key recovery manager 560 may be configured as or otherwise support a means for decrypting, using the ciphertext and the private decryption key, the first portion of the secret key.

In some examples, the key recovery manager 560 may be configured as or otherwise support a means for providing authentication information to the service provider, wherein the ciphertext is obtained based at least in part on providing the authentication information.

In some examples, to support decrypting the first portion of the secret key, the key recovery manager 560 may be configured as or otherwise support a means for executing a threshold decryption operation with two or more parties comprising at least the service provider.

In some examples, the keypair generation manager 540 may be configured as or otherwise support a means for generating a secret verifiable decryption key and a public verifiable encryption key. In some examples, the key encryption manager 545 may be configured as or otherwise support a means for providing, to the service provider, the public verifiable encryption key, wherein the service provider encrypts the second portion of the secret key using the public verifiable encryption key.

In some examples, to support verifying the encryption of the second portion of the secret key, the key verification manager 535 may be configured as or otherwise support a means for computing a portion of the public key associated with the second portion of the secret key using the first portion of the secret key and the public verifiable encryption key. In some examples, to support verifying the encryption of the second portion of the secret key, the key verification manager 535 may be configured as or otherwise support a means for verifying that the second portion of the secret key is encrypted using the computed portion of the public key without revealing the second portion of the secret key.

In some examples, the key recovery manager 560 may be configured as or otherwise support a means for receiving a request to obtain the secret key. In some examples, the key recovery manager 560 may be configured as or otherwise support a means for decrypting, in response to receiving the request, the encryption of the second portion of the secret key using the secret verifiable decryption key. In some examples, the key recovery manager 560 may be configured as or otherwise support a means for obtaining the ciphertext from the secure environment. In some examples, the key recovery manager 560 may be configured as or otherwise support a means for decrypting the ciphertext using the private decryption key resulting in the first portion of the secret key. In some examples, the key recovery manager 560 may be configured as or otherwise support a means for generating the secret key based at least in part on the first portion of the secret key and the second portion of the secret key.

In some examples, the key recovery manager 560 may be configured as or otherwise support a means for generating the encryption of the second portion of the secret key using a password-hardened encryption of the second portion of the secret key and a user-provided password.

In some examples, the key encryption manager 545 may be configured as or otherwise support a means for encrypting the encryption of the second portion of the secret key using a user-provided password to generate a password-hardened encryption of the second portion of the secret key.

In some examples, the secure environment is a storage cloud.

Figure 6:
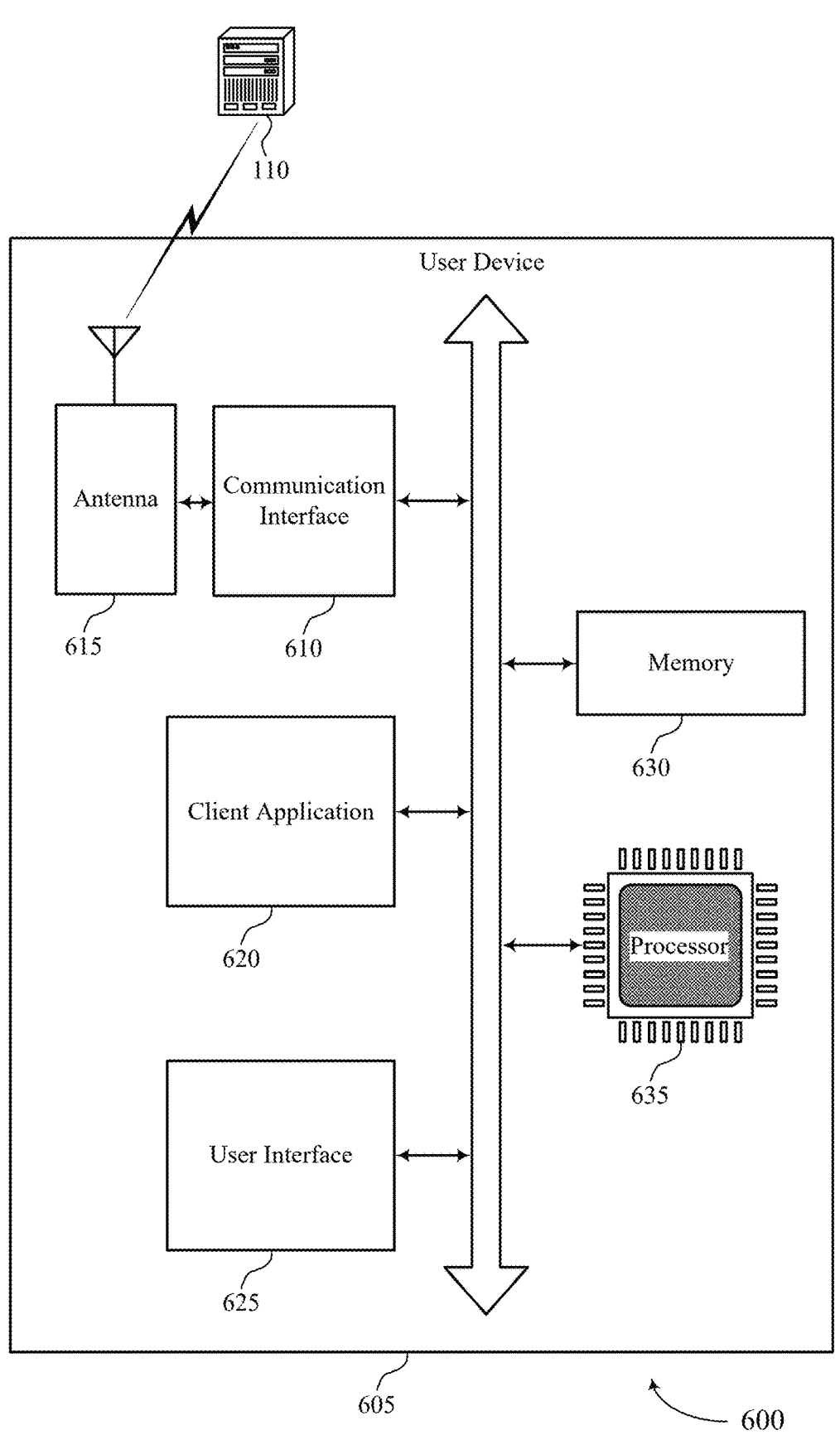
FIG. 6 shows a diagram of a system including a device that supports techniques for storing key backups in accordance with aspects of the present disclosure.

FIG. 6 shows a diagram of a system 600 including a device 605 that supports techniques for storing key backups in accordance with aspects of the present disclosure. The device 605 may be an example of or include components of a device 405 as described herein. The device 605 may include components for bi-directional voice and data communications including components for transmitting and receiving communications, such as a client application 620, a communication interface 610, one or more antennas 615, a user interface 625, at least one memory 630, and at least one processor 635. Each of these components may communicate, directly or indirectly, with one another (e.g., via one or more buses, communications links, communications interfaces, or any combination thereof)

The communication interface 610 may manage input and output signals for the device 605 via the antenna 615. For example, the communication interface 610 may enable the user device 605 to exchange information (e.g., input information, output information, or both) with other systems or devices, such as custodial token platform 110 (e.g., supported by one or more servers), via one or more wired or wireless communication links. The communication interface 610 may also utilize or interact with antenna 615 to support communication with other systems or devices. In some cases, the communication interface 610 may represent a physical connection or port to an external peripheral, such as a hardware wallet device. In some cases, the communication interface 610 may utilize an operating system such as iOS®, ANDROID®, MS-DOS®, MS-WINDOWS®, OS/2®, UNIX®, LINUX®, or another known operating system. The communication interface 610 may be implemented as part of the processor 635.

In some cases, the device 605 may include a single antenna 615. However, in some other cases, the device 605 may have more than one antenna 615, which may be capable of concurrently transmitting or receiving multiple wireless transmissions. The communication interface 610 may communicate bi-directionally, via the one or more antennas 615, wired, or wireless links as described herein. For example, the communication interface 610 may represent a wireless transceiver and may communicate bi-directionally with another wireless transceiver. The communication interface 610 may also include a modem to modulate the packets, to provide the modulated packets to one or more antennas 615 for transmission, and to demodulate packets received from the one or more antennas 615.

The user interface 625 may represent interact with a keyboard, a mouse, a touchscreen, a microphone, or a similar device or component. In some cases, a user may interact with the user interface 625. In other cases, the user interface 625 may operate automatically without user interaction. The user interface 625 may display or output information such as information received from other systems or devices or information to be transmitted to other systems or devices.

The memory 630 may include RAM and ROM. The memory 630 may store computer-readable, computer-executable software including instructions that, when executed, cause at least one processor 635 to perform various functions described herein. In some cases, the memory 630 may contain, among other things, a BIOS which may control basic hardware or software operation such as the interaction with peripheral components or devices. The memory 630 may be an example of a single memory or multiple memories. For example, the user device 605 may include one or more memories 630.

The processor 635 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 635 may be configured to operate a memory array using a memory controller. In other cases, a memory controller may be integrated into the processor 635. The processor 635 may be configured to execute computer-readable instructions stored in at least one memory 630 to perform various functions (e.g., functions or tasks supporting a method and system for techniques for storing key backups). Though a single processor 635 is depicted in the example of FIG. 6, it is to be understood that the user device 605 may include any quantity of one or more of processors 635 and that a group of processors 635 may collectively perform one or more functions ascribed herein to a processor, such as the processor 635. The processor 635 may be an example of a single processor or multiple processors. For example, the device 605 may include one or more processors 635.

The client application 620 may support management of a secret key in accordance with examples as disclosed herein. For example, the client application 620 may be configured as or otherwise support a means for generating a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key. The client application 620 may be configured as or otherwise support a means for obtaining the encryption of the second portion of the secret key from the service provider. The client application 620 may be configured as or otherwise support a means for verifying, using the verifiable encryption scheme and without decrypting the encryption of the second portion of the secret key, that the encryption of the second portion of the secret key and the first portion of the secret key are associated with the public key. The client application 620 may be configured as or otherwise support a means for generating a backup encryption keypair, the backup encryption keypair comprising a public encryption key and a private decryption key. The client application 620 may be configured as or otherwise support a means for encrypting the first portion of the secret key using the public encryption key, wherein encrypting the first portion of the secret key results in a ciphertext. The client application 620 may be configured as or otherwise support a means for storing the private decryption key in a secure environment. The client application 620 may be configured as or otherwise support a means for transmitting the ciphertext resulting from encryption of the first portion of the secret key to the service provider.

By including or configuring the client application 620 in accordance with examples as described herein, the device 605 may support techniques for storing key backups, which may result in improved reliability, improved security, reduced latency, and improved user experience related to more autonomous access to digital wallets.

The client application 620 may include an application (e.g., "app"), program, software, extension, or other component which is configured to facilitate communications with a custodial token platform 110 on a server, one or more nodes of a blockchain network 105, other user devices 605, and other devices or systems. For example, the client application 620 may be an application executable on the user device 605, and the client application 620 may be configured to receive data from a custodial token platform 110, transmit data to the custodial token platform 110, process such data, and cause presentation of such data to a user via a user interface 625. The client application 620 may be an example of a wallet application, a wallet device, or both, and may be associated with a wallet address and may access or use a private key to sign messages to facilitate transfer of crypto tokens, messages, transactions, or the like via a blockchain distributed data store.

FIG. 7 shows a flowchart illustrating a method 700 that supports techniques for storing key backups in accordance with aspects of the present disclosure. The operations of the method 700 may be implemented by a user device or its components as described herein. For example, the operations of the method 700 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 705, the method may include generating a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key. The operations of 705 may be performed in accordance with examples as disclosed herein. In some examples, aspects of the operations of 705 may be performed by a key generation manager 525 as described with reference to FIG. 5.

At 710, the method may include obtaining the encryption of the second portion of the secret key from the service provider. The operations of 710 may be performed in accordance with examples as disclosed herein. In some examples, aspects of the operations of 710 may be performed by a key reception manager 530 as described with reference to FIG. 5.

At 715, the method may include verifying, using the verifiable encryption scheme and without decrypting the encryption of the second portion of the secret key, that the encryption of the second portion of the secret key and the first portion of the secret key are associated with the public key. The operations of 715 may be performed in accordance with examples as disclosed herein. In some examples, aspects of the operations of 715 may be performed by a key verification manager 535 as described with reference to FIG. 5.

At 720, the method may include generating a backup encryption keypair, the backup encryption keypair comprising a public encryption key and a private decryption key. The operations of 720 may be performed in accordance with examples as disclosed herein. In some examples, aspects of the operations of 720 may be performed by a keypair generation manager 540 as described with reference to FIG. 5.

At 725, the method may include encrypting the first portion of the secret key using the public encryption key, wherein encrypting the first portion of the secret key results in a ciphertext. The operations of 725 may be performed in accordance with examples as disclosed herein. In some examples, aspects of the operations of 725 may be performed by a key encryption manager 545 as described with reference to FIG. 5.

At 730, the method may include storing the private decryption key in a secure environment. The operations of 730 may be performed in accordance with examples as disclosed herein. In some examples, aspects of the operations of 730 may be performed by a key storage manager 550 as described with reference to FIG. 5.

At 735, the method may include transmitting the ciphertext resulting from encryption of the first portion of the secret key to the service provider. The operations of 735 may be performed in accordance with examples as disclosed herein. In some examples, aspects of the operations of 735 may be performed by a key transmission manager 555 as described with reference to FIG. 5.

A method for management of a secret key by an apparatus is described. The method may include generating a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key, obtaining the encryption of the second portion of the secret key from the service provider, verifying, using the verifiable encryption scheme and without decrypting the encryption of the second portion of the secret key, that the encryption of the second portion of the secret key and the first portion of the secret key are associated with the public key, generating a backup encryption keypair, the backup encryption keypair comprising a public encryption key and a private decryption key, encrypting the first portion of the secret key using the public encryption key, wherein encrypting the first portion of the secret key results in a ciphertext, storing the private decryption key in a secure environment, and transmitting the ciphertext resulting from encryption of the first portion of the secret key to the service provider.

An apparatus for management of a secret key is described. The apparatus may include one or more memories storing processor executable code, and one or more processors coupled with the one or more memories. The one or more processors may individually or collectively be operable to execute the code to cause the apparatus to generate a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key, obtain the encryption of the second portion of the secret key from the service provider, verify, using the verifiable encryption scheme and without decrypting the encryption of the second portion of the secret key, that the encryption of the second portion of the secret key and the first portion of the secret key are associated with the public key, generate a backup encryption keypair, the backup encryption keypair comprising a public encryption key and a private decryption key, encrypt the first portion of the secret key using the public encryption key, wherein encrypting the first portion of the secret key results in a ciphertext, store the private decryption key in a secure environment, and transmit the ciphertext resulting from encryption of the first portion of the secret key to the service provider.

Another apparatus for management of a secret key is described. The apparatus may include means for generating a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key, means for obtaining the encryption of the second portion of the secret key from the service provider, means for verifying, using the verifiable encryption scheme and without decrypting the encryption of the second portion of the secret key, that the encryption of the second portion of the secret key and the first portion of the secret key are associated with the public key, means for generating a backup encryption keypair, the backup encryption keypair comprising a public encryption key and a private decryption key, means for encrypting the first portion of the secret key using the public encryption key, wherein encrypting the first portion of the secret key results in a ciphertext, means for storing the private decryption key in a secure environment, and means for transmitting the ciphertext resulting from encryption of the first portion of the secret key to the service provider.

A non-transitory computer-readable medium storing code for management of a secret key is described. The code may include instructions executable by one or more processors to generate a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key, obtain the encryption of the second portion of the secret key from the service provider, verify, using the verifiable encryption scheme and without decrypting the encryption of the second portion of the secret key, that the encryption of the second portion of the secret key and the first portion of the secret key are associated with the public key, generate a backup encryption keypair, the backup encryption keypair comprising a public encryption key and a private decryption key, encrypt the first portion of the secret key using the public encryption key, wherein encrypting the first portion of the secret key results in a ciphertext, store the private decryption key in a secure environment, and transmit the ciphertext resulting from encryption of the first portion of the secret key to the service provider.

Some examples of the method, apparatus, and non-transitory computer-readable medium described herein may further include operations, features, means, or instructions for receiving a request to recover the first portion of the secret key, obtaining, from the service provider in response to receiving the request, the ciphertext resulting from encryption of the first portion of the secret key, obtaining, from the secure environment, the private decryption key, and decrypting, using the ciphertext and the private decryption key, the first portion of the secret key.

Some examples of the method, apparatus, and non-transitory computer-readable medium described herein may further include operations, features, means, or instructions for providing authentication information to the service provider, wherein the ciphertext may be obtained based at least in part on providing the authentication information.

In some examples of the method, apparatus, and non-transitory computer-readable medium described herein, decrypting the first portion of the secret key may include operations, features, means, or instructions for executing a threshold decryption operation with two or more parties comprising at least the service provider.

Some examples of the method, apparatus, and non-transitory computer-readable medium described herein may further include operations, features, means, or instructions for generating a secret verifiable decryption key and a public verifiable encryption key and providing, to the service provider, the public verifiable encryption key, wherein the service provider encrypts the second portion of the secret key using the public verifiable encryption key.

In some examples of the method, apparatus, and non-transitory computer-readable medium described herein, verifying the encryption of the second portion of the secret key may include operations, features, means, or instructions for computing a portion of the public key associated with the second portion of the secret key using the first portion of the secret key and the public verifiable encryption key and verifying that the second portion of the secret key may be encrypted using the computed portion of the public key without revealing the second portion of the secret key.

Some examples of the method, apparatus, and non-transitory computer-readable medium described herein may further include operations, features, means, or instructions for receiving a request to obtain the secret key, decrypting, in response to receiving the request, the encryption of the second portion of the secret key using the secret verifiable decryption key, obtaining the ciphertext from the secure environment, decrypting the ciphertext using the private decryption key resulting in the first portion of the secret key, and generating the secret key based at least in part on the first portion of the secret key and the second portion of the secret key.

Some examples of the method, apparatus, and non-transitory computer-readable medium described herein may further include operations, features, means, or instructions for generating the encryption of the second portion of the secret key using a password-hardened encryption of the second portion of the secret key and a user-provided password.

Some examples of the method, apparatus, and non-transitory computer-readable medium described herein may further include operations, features, means, or instructions for encrypting the encryption of the second portion of the secret key using a user-provided password to generate a password-hardened encryption of the second portion of the secret key.

In some examples of the method, apparatus, and non-transitory computer-readable medium described herein, the secure environment may be a storage cloud.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for management of a secret key, comprising:
generating a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key;
obtaining the encryption of the second portion of the secret key from the service provider;
verifying, using the verifiable encryption scheme and without decrypting the encryption of the second portion of the secret key, that the encryption of the second portion of the secret key and the first portion of the secret key are associated with the public key;
generating a backup encryption keypair, the backup encryption keypair comprising a public encryption key and a private decryption key;
encrypting the first portion of the secret key using the public encryption key, wherein encrypting the first portion of the secret key results in a ciphertext;
storing the private decryption key in a secure environment; and
transmitting the ciphertext resulting from encryption of the first portion of the secret key to the service provider.

2. The method of claim 1, further comprising:
receiving a request to recover the first portion of the secret key;

obtaining, from the service provider in response to receiving the request, the ciphertext resulting from encryption of the first portion of the secret key;

obtaining, from the secure environment, the private decryption key; and decrypting, using the ciphertext and the private decryption key, the first portion of the secret key.

3. The method of claim 2, further comprising:

providing authentication information to the service provider, wherein the ciphertext is obtained based at least in part on providing the authentication information.

4. The method of claim 2, wherein decrypting the first portion of the secret key comprises:

executing a threshold decryption operation with two or more parties comprising at least the service provider.

5. The method of claim 1, further comprising:

generating a secret verifiable decryption key and a public verifiable encryption providing, to the service provider, the public verifiable encryption key, key; and wherein the service provider encrypts the second portion of the secret key using the public verifiable encryption key.

6. The method of claim 5, wherein verifying the encryption of the second portion of the secret key comprises:

computing a portion of the public key associated with the second portion of the secret key using the first portion of the secret key and the public verifiable encryption key; and verifying that the second portion of the secret key is encrypted using the computed portion of the public key without revealing the second portion of the secret key.

7. The method of claim 5, further comprising:

receiving a request to obtain the secret key;

decrypting, in response to receiving the request, the encryption of the second portion of the secret key using the secret verifiable decryption key;

obtaining the ciphertext from the secure environment;

decrypting the ciphertext using the private decryption key resulting in the first portion of the secret key; and generating the secret key based at least in part on the first portion of the secret key and the second portion of the secret key.

8. The method of claim 7, further comprising:

generating the encryption of the second portion of the secret key using a password-hardened encryption of the second portion of the secret key and a user-provided password.

9. The method of claim 1, further comprising:

encrypting the encryption of the second portion of the secret key using a user-provided password to generate a password-hardened encryption of the second portion of the secret key.

10. The method of claim 1, wherein the secure environment is a storage cloud.

11. An apparatus for management of a secret key, comprising:

one or more memories storing processor-executable code; and one or more processors coupled with the one or more memories and individually or collectively operable to execute the code to cause the apparatus to:

generate a first portion of the secret key at a user device, wherein the secret key is associated with a public key and wherein a second portion of the secret key is obtained by a service provider and encrypted by the service provider using a verifiable encryption scheme resulting in an encryption of the second portion of the secret key;

obtain the encryption of the second portion of the secret key from the service provider;

verify, using the verifiable encryption scheme and without decrypting the encryption of the second portion of the secret key, that the encryption of the second portion of the secret key and the first portion of the secret key are associated with the public key;

generate a backup encryption keypair, the backup encryption keypair comprising a public encryption key and a private decryption key;

encrypt the first portion of the secret key using the public encryption key, wherein encrypting the first portion of the secret key results in a ciphertext;

store the private decryption key in a secure environment; and transmit the ciphertext resulting from encryption of the first portion of the secret key to the service provider.

12. The apparatus of claim 11, wherein the one or more processors are individually or collectively further operable to execute the code to cause the apparatus to:

receive a request to recover the first portion of the secret key;

obtain, from the service provider in response to receiving the request, the ciphertext resulting from encryption of the first portion of the secret key;

obtain, from the secure environment, the private decryption key; and decrypt, using the ciphertext and the private decryption key, the first portion of the secret key.

13. The apparatus of claim 12, wherein the one or more processors are individually or collectively further operable to execute the code to cause the apparatus to:

provide authentication information to the service provider, wherein the ciphertext is obtained based at least in part on providing the authentication information.

14. The apparatus of claim 12, wherein, to decrypt the first portion of the secret key, the one or more processors are individually or collectively operable to execute the code to cause the apparatus to:

execute a threshold decryption operation with two or more parties comprising at least the service provider.

15. The apparatus of claim 11, wherein the one or more processors are individually or collectively further operable to execute the code to cause the apparatus to:

generate a secret verifiable decryption key and a public verifiable encryption key; and provide, to the service provider, the public verifiable encryption key, wherein the service provider encrypts the second portion of the secret key using the public verifiable encryption key.

16. The apparatus of claim 15, wherein, to verify the encryption of the second portion of the secret key, the one or more processors are individually or collectively operable to execute the code to cause the apparatus to:

compute a portion of the public key associated with the second portion of the secret key using the first portion of the secret key and the public verifiable encryption key; and verify that the second portion of the secret key is encrypted using the computed portion of the public key without revealing the second portion of the secret key.

17. The apparatus of claim 15, wherein the one or more processors are individually or collectively further operable to execute the code to cause the apparatus to:

receive a request to obtain the secret key;

decrypt, in response to receive the request, the encryption of the second portion of the secret key using the secret verifiable decryption key;

obtain the ciphertext from the secure environment;

decrypt the ciphertext using the private decryption key resulting in the first portion of the secret key; and generate the secret key based at least in part on the first portion of the secret key and the second portion of the secret key.

18. The apparatus of claim 17, wherein the one or more processors are individually or collectively further operable to execute the code to cause the apparatus to:

generate the encryption of the second portion of the secret key using a password-hardened encryption of the second portion of the secret key and a user-provided password.

19. The apparatus of claim 11, wherein the one or more processors are individually or collectively further operable to execute the code to cause the apparatus to:

encrypt the encryption of the second portion of the secret key using a user-provided password to generate a password-hardened encryption of the second portion of the secret key.

20. A non-transitory computer-readable medium storing code for management of a secret key, the code comprising instructions executable by one or more processors to:

generate a first portion of the secret key at a user device, wherein the secret key is associated with a public key and wherein a second portion of the secret key is obtained by a service provider and encrypted by the service provider using a verifiable encryption scheme resulting in an encrypted second portion of the secret key;

obtain the encrypted second portion of the secret key from the service provider;

verify, using the verifiable encryption scheme and without decrypting the encrypted second portion of the secret key, that the encrypted second portion of the secret key and the first portion of the secret key are associated with the public key;

generate a backup encryption keypair, the backup encryption keypair comprising a public encryption key and a private decryption key;

encrypt the first portion of the secret key using the public encryption key, wherein encrypting the first portion of the secret key results in a ciphertext;

store the private decryption key in a secure environment; and transmit the ciphertext resulting from encryption of the first portion of the secret key to the service provider.

* * * * *